United States Patent [19]

Olry et al.

[11] Patent Number: 5,226,217
[45] Date of Patent: Jul. 13, 1993

[54] INSTALLATION FOR MAKING NEEDLED FIBER PREFORMS FOR USE IN MANUFACTURING PARTS MADE OF COMPOSITE MATERIAL

[75] Inventors: Pierre Olry, Bordeaux; Philippe Dupont, Le Bouscat, both of France

[73] Assignee: Societe Europeenne de Propulsion, Suresnes, France

[21] Appl. No.: 801,435

[22] Filed: Dec. 2, 1991

[30] Foreign Application Priority Data

Dec. 3, 1990 [FR] France ................. 90 15126

[51] Int. Cl.⁵ ........................................... D04H 18/00
[52] U.S. Cl. ..................................................... 28/107
[58] Field of Search .................. 28/107, 143, 108–115; 112/80.02

[56] References Cited

U.S. PATENT DOCUMENTS

| | | | |
|---|---|---|---|
| 2,142,728 | 1/1939 | Kienzle | 28/115 |
| 2,177,604 | 10/1939 | Stone | 28/107 |
| 3,112,548 | 12/1963 | Smith | 28/115 |
| 3,287,786 | 11/1966 | Goy | 28/107 |
| 3,340,586 | 9/1967 | Zocher | 28/115 |
| 3,977,335 | 8/1976 | Bonham | 112/80.02 |
| 4,241,479 | 12/1980 | Dilo | 28/107 |
| 4,628,846 | 12/1986 | Vives | 112/262.1 |

FOREIGN PATENT DOCUMENTS

| | | |
|---|---|---|
| 0147297 | 7/1985 | European Pat. Off. . |
| 2010350 | 6/1979 | United Kingdom . |
| 2126612 | 3/1984 | United Kingdom . |

Primary Examiner—Clifford D. Crowder
Assistant Examiner—Amy Brooke Vanatta
Attorney, Agent, or Firm—Weingarten, Schurgin, Gagnebin & Hayes

[57] ABSTRACT

The installation comprises support tooling having a shape that corresponds to that of the preform to be made and on which superposed layers of a two-dimensional fiber fabric can be draped; a needling head comprising a group of needles, a device for driving the needles lengthwise with reciprocating translation motion, and a bearing plate provided with perforations to pass the needles and suitable for being pressed against a layer draped over the support tooling; an arm carrying the needling head and possessing a plurality of degrees of freedom; and a control device for automatically controlling the displacement of the arm to move the needling head within the range of the arm along predetermined trajectories and with predetermined orientations.

6 Claims, 3 Drawing Sheets

INSTALLATION FOR MAKING NEEDLED FIBER PREFORMS FOR USE IN MANUFACTURING PARTS MADE OF COMPOSITE MATERIAL

The invention relates in general to making parts of composite material comprising fiber reinforcement densified by a matrix. More precisely, the invention relates to making fiber reinforcement constituting a needled fiber preform whose shape corresponds substantially to that of the part to be manufactured.

One particular, but not exclusive, field to which the invention is applicable is making preforms for parts made of thermostructural composite material. Such a material is characterized by high mechanical performance and by the ability to conserve its performance up to high temperatures. Typical thermostructural composite materials are carbon/carbon (C/C) composites having carbon fiber reinforcement and a carbon matrix, and ceramic matrix composites (CMC) which generally have a reinforcement made of carbon fibers or of ceramic fibers.

BACKGROUND OF THE INVENTION

A known method of making fiber preforms consists in superposing layers of two dimensional fiber fabric such as a cloth or a felt, and in interconnecting the layers by needling. For a part that is to be subjected to high mechanical or thermomechanical stresses, it is desirable to obtain bonding between the layers of a preform in order to avoid the part being damaged or destroyed by delaminating, i.e. by two of its layers coming apart.

Documents FR-A-2 557 550, FR-A-2 584 106, and FR-A-2 584 107 describe methods and installations for manufacturing needled fiber preforms, and respectively: non-cylindrical asymmetrical preforms; preforms comprising layers stacked flat; and circularly symmetrical cylindrical preforms. According to those documents, the preforms are made up of a plurality of wound or superposed layers formed by a tape or a strip of cloth. As the preform is built up, each new layer is needled to the underlying structure by using a set of needles extending across the entire width of the tape or the strip of cloth.

The above-mentioned methods and installations are suitable for making preforms of a general shape that is relatively simple, but they cannot be used for more complicated shapes.

An object of the present invention is thus to provide an installation which does not suffer from such a limitation and which consequently makes it possible to make fiber preforms that are complex in shape.

SUMMARY OF THE INVENTION

According to the invention, this object is achieved by means of an installation comprising:

support tooling having a shape that corresponds to that of the preform to be made and on which superposed layers of a two-dimensional fiber fabric can be draped;

a needling head comprising a group of needles, a device for driving the needles lengthwise with reciprocating translation motion, and a bearing plate provided with perforations to pass the needles and suitable for being pressed against a layer draped over the support tooling;

an arm carrying the needling head and possessing a plurality of degrees of freedom; and a control device for automatically controlling the displacement of the arm to move the needling head within the range of the arm along predetermined trajectories and with predetermined orientations.

An essential characteristic of the invention consists in mounting the needling head on an arm which preferably has six degrees of freedom, with the term "arm" being used herein to designate not only the arm of a robot, but also a tool-carrying spindle in a numerically controlled machine tool, and more generally any member capable of carrying the needling head and having a plurality of degrees of freedom. Consequently, after a layer has been draped over the supporting tooling, this layer may be needled by causing the needling head to follow predetermined trajectories to cover the entire area of the layer. In addition, the direction in which the head points is adjustable in each of its positions so as to enable it to adapt to the profile of the draped layer.

The needling head may be provided with a perforated bearing plate through which the needles pass. The bearing plate performs a holding function analogous to that of the presser foot of a sewing machine, i.e. it holds the layer that is being needled in place. Since the bearing plate is pressed against the layer being needled, it also serves to compact the preform, thereby improving needling and increasing the interlamination shear strength of the part (i.e. parallel to its layers). In addition, the bearing plate performs a stripping function by retaining the fibers that could otherwise be entrained with the needles when the needles leave the preform.

BRIEF DESCRIPTION OF THE DRAWINGS

An embodiment of the invention is described by way of example with reference to the accompanying drawings, in which.

DETAILED DESCRIPTION

Figure 1:
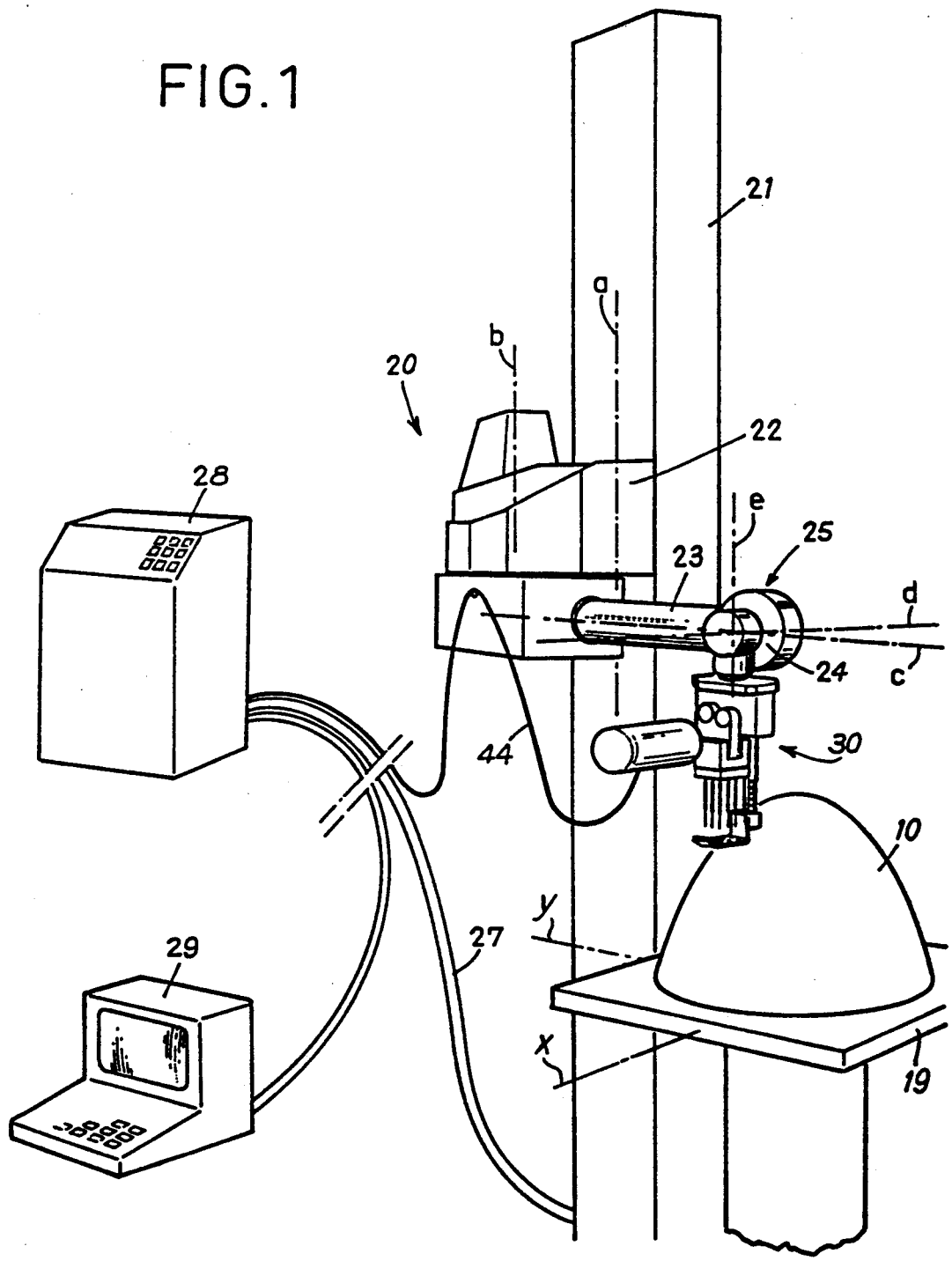
FIG. 1 is an overall view of a needling installation of the invention.

FIG. 1 is a diagram of a needling installation comprising supporting tooling 10 fixed on a table 19 for receiving the layers of the fiber preform to be needled, a robot 20 and its control unit 28 connected to an operator console 29, and a needling head 30 fixed to the end of the arm 25 of the robot 20.

The robot 20 and its control unit 28 are constituted by any commercially available programmable machine providing six degrees of freedom at the end of the arm, e.g. the machine sold under reference RS 156 by the French firm Staubli.

In the example shown, the robot 20 comprises a column 21 having a support 22 vertically movable therealong (along an axis a) and capable of rotating about a vertical axis (likewise the axis a). A rod 23 is hinged to the support 22 (about a vertical axis b). By combining the three degrees of freedom: translation motion along the axis a, rotation about the axis a, and rotation about the axis b, it is possible to bring the end of the robot arm into any position in the space lying within the range of the robot.

The end of the rod 23 carries a triple hinge 24 which together with the rod 23 forms the arm of the robot 25. The triple hinge 24 enables the end of the robot arm to be tilted into any direction in three dimensions by combining three rotary motions respectively about the horizontal axis c of the rod 23 (or an axis parallel thereto), about a horizontal axis d perpendicular to the axis c, and about a vertical axis e perpendicular to both axes c and d.

Motors (not shown) serve to perform displacements about the six above-mentioned degrees of freedom and they are controlled by signals produced by the control unit 28 to which the robot is connected by a flexible cable 27.

The volume within which the robot can act may be increased by fixing the tooling 10 on a table which is itself displaceable, e.g. along at least two orthogonal horizontal axes X and Y. Other degrees of freedom could be given to the table, e.g. it could be capable of rotating about a vertical axis and of tilting about a horizontal axis. The movements of the table are then under the control of signals produced by the control unit 28 so that the movements of the table and the movements of the robot arm are coordinated in order to bring the needling head into the desired position relative to the support tooling.

Figure 2:
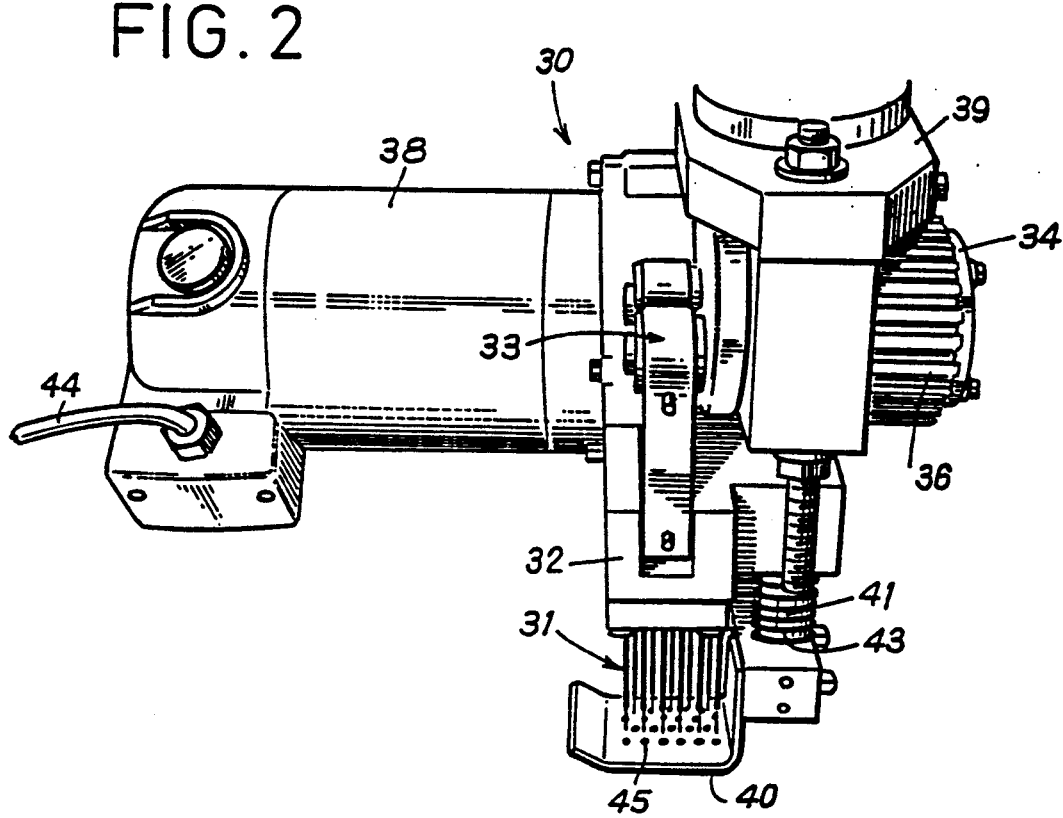
FIGS. 2 and 3 are views showing the needling head of the FIG. 1 installation on a larger scale.
Figure 3:
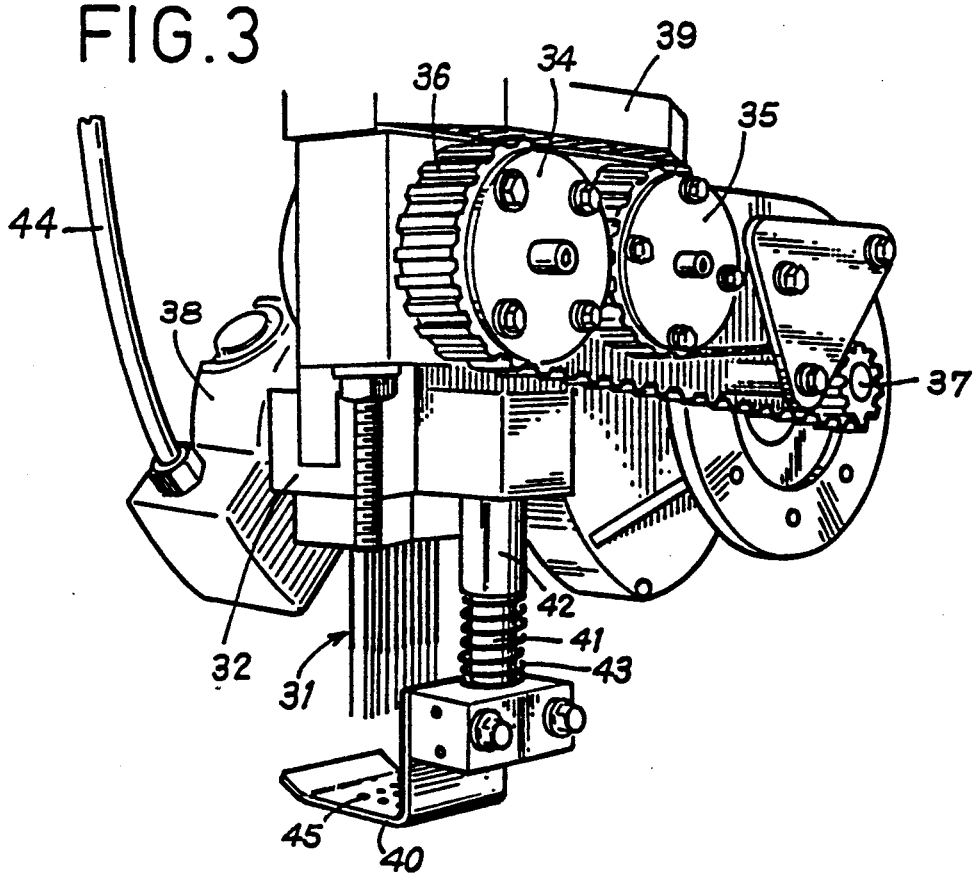

As shown in detail in FIGS. 2 and 3, the needling head 30 comprises a set of needles 31 that are mutually parallel and fixed to a needle-carrying piece 32. This piece is driven with reciprocating translation motion parallel to the needles by means of a double crank and connecting rod system 33. The cranks are constrained to rotate with wheels 34 and 35 that are rotated in opposite directions. To this end, the wheels 34 and 35 are mounted on shafts carrying gear wheels over which a cog belt 36 passes. The belt 36 is driven by a gear wheel on the drive shaft 37 of an electric motor 38.

The shafts of the wheels 34 and 35 and of the motor 37 are carried by a plate 39 for supporting the needling head, which plate is fixed to the end of the arm 25.

The plate 39 also carries a perforated bearing plate 40. This plate is mounted at the end of a rod 41 which is capable of sliding parallel to the needless 31 inside a tubular part 42 fixed to the plate 39. A return spring 43 urges the bearing plate 40 towards an abutment position which is distant from the plate 39.

The bearing plate 40 faces the ends of the needless 31 and has perforations 45 through which the needless pass during their reciprocating motion.

Thus, the needling head 30 constitutes a self-contained assembly having its own drive motor carried by the robot arm. The motor is controlled by the control unit 28 to which it is connected by a flexible cable 44.

The needling head is advantageously interchangeable, in full or in part, so as to enable it to be adapted to the shape and the size of the fiber preform. Thus, the number of needless in the set of needles 31 may be increased or decreased.

The above-described needling installation operates as follows.

The support tooling 10 constitutes a shape whose outside surface corresponds to the shape that is to be imparted to the fiber preform. In the example shown in FIG. 1, this shape is approximately that of a parabolic dish and is intended to constitute the front portion or "nose" of a space aircraft.

Figure 4:
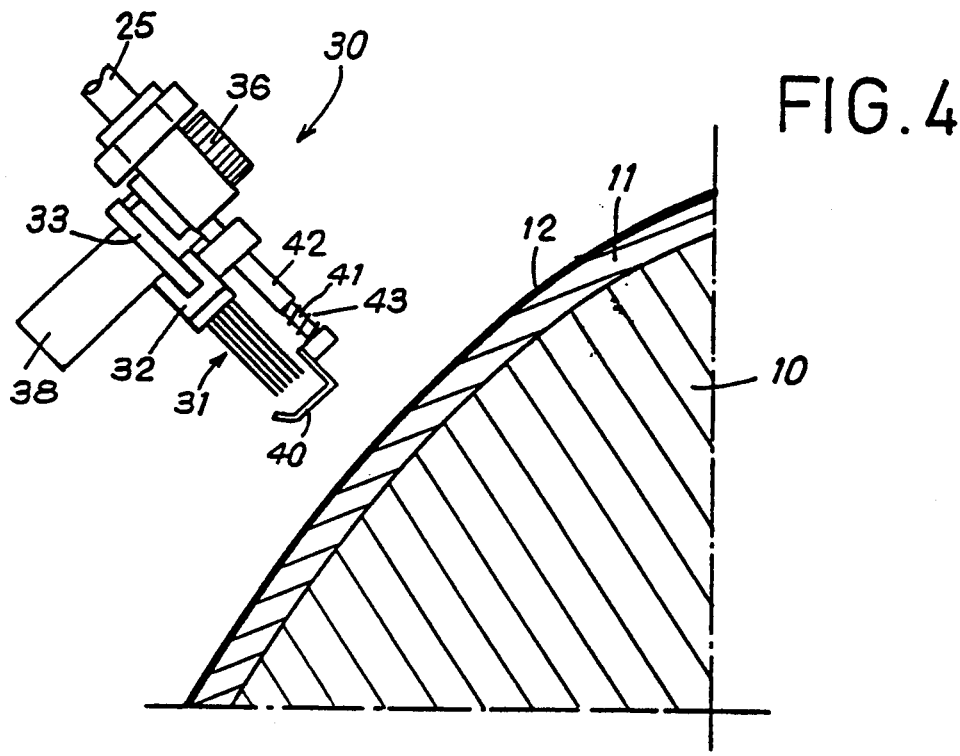
FIGS. 4 and 5 show the operation of the FIG. 1 installation.

The support tooling is made of a material that is easily machined or molded, e.g. expanded polystyrene. It is covered with a base felt 11 (FIG. 4), e.g. made of polyurethane, and into which the needles can penetrate easily while the first layers of the preform are being needled. A sheet 12, e.g. of polyvinyl chloride, is glued on the base felt. During needling, the sheet 12 is punctured by the needless but it prevents the fibers of the fiber preform being engaged in the base felt which would otherwise complicate removing the finished preform.

The fiber preform is built up from superposed layers 13 of fiber fabric. This fabric may be constituted, for example, by a deformable cloth that has been pre-needled with a fiber web. The cloth and the web are both made of fibers of a material that has been selected for the preform or of a precursor of such a material that is more suitable for being subjected to a needling operation. For high temperature applications, the preform may be made, for example, of carbon fibers, or of preoxidized polyacrylonitrile (PAN) fibers that constitute a precursor for carbon, or of ceramic fibers, or of fibers made of a precursor for a ceramic. Preoxidized PAN is transformed into carbon or a ceramic precursor is transformed into a ceramic by heat treatment after the preform has been made.

Figure 5:
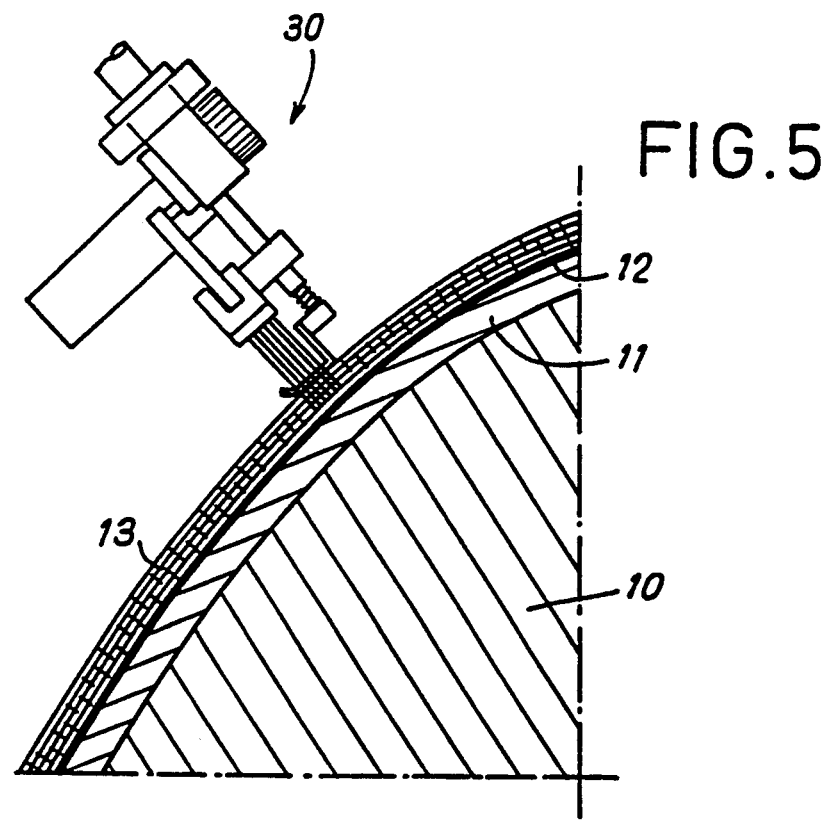

Each time a new layer is superposed on the support tooling, this layer is needled to the underlying structure (FIG. 5). Advantageously, the depth to which the needless penetrate into the structure is constant throughout the needling process.

The position and the orientation of the needling head are controlled to needle each layer along pre-established paths at a predetermined angle of incidence, which is generally normal to the layer in the needling zone.

The position of the needling head is defined so as to bring the bearing plate 40 against the layers to be needled so as to cause the spring 43 to exert pressure thereon (FIG. 5). The pressure exerted by the thrust plate is advantageously controlled by compressing the spring 43 by a predetermined amount. The spring is compressed by placing the head appropriately relative to the most recent layer to be put into place on the tooling.

In a variant, the controlled pressure exerted by the bearing plate may be exerted by an actuator fixed on the needling head and having its actuator rod carrying the bearing plate.

Advantageously, the bearing plate may be given a slightly curved shape so that it is capable of adapting approximately to the profile of the layers draped over the tooling 10, over the entire area of said layers.

The bearing plate enables the needles 31 to pass through the perforations 45, but it retains any fibers that may be entrained by the needles when they are withdrawn from the needled structure, thus performing a stripping function. In addition, the pressure exerted by the bearing plate ensures that the last-draped layer is held in place and it enables the fiber structure to be compacted at the same time as it is being needled.

Also advantageously, in order to cause the needing trajectories to criss-cross from one layer to another, thereby avoiding the formation of privileged needling planes in the preform, the table 19 including the supporting tooling is rotated through a certain angle, e.g. 60°, after each layer has been needled.

After the last layer has been needled, the needled preform is removed from the support tooling 10 with the base felt 11 and the separation sheet 12 being peeled off therefrom. The preform can then be densified, e.g. by chemical vapor infiltration, thereby obtaining the desired part made of composite material.

In the above description, it has been assumed that the robot is used to control the position and the orientation of the needling head. As already mentioned, it is possible to mount the needling head on the tool-carrying spindle of a numerically controlled machine tool having the required number of degrees of freedom.

Under such circumstances, the needles may be driven by the spindle of the machine tool.

We claim:

1. An installation for making a needled fiber preform of complex shape for use in manufacturing a part made of composite material, the installation comprising:

support tooling having a shape that corresponds to a non-planar preform being constructed and upon which are draped superposed fibrous layers of a two-dimensional fiber fabric used in forming said non-planar preform;

a needling head comprising a group of needles, a device for driving the needles lengthwise with reciprocating translation motion, and a bearing plate provided with perforations to pass the needles and suitable for being pressed against said fibrous layer draped over the support tooling;

an arm carrying the needling head so that said needling head is movable by combining a plurality of different elementary motions selected from rotation motions and translation motions with respect to axes selected from a plurality of axes having different orientations, said plurality of different elementary motions being a function of contour of the non-planar preform;

at least one actuator associated with said arm to control said plurality of different motions; and a control device connected to said at least one actuator, said control device automatically controlling position and orientation of the needling head during needling to allow a needling of fibrous layers to be carried out along predetermined paths and at a predetermined angle of incidence of the needless with respect to the fibrous layers.

2. An installation according to claim 1, wherein the number of different elementary motions is at least equal to six.

3. An installation according to claim 1, wherein the support tooling is carried by a table which is movable by combining a plurality of elementary motions.

4. An installation according to claim 1, wherein the bearing plate is movable parallel to the needless and is urged by a spring to be pressed against the fibrous layers.

5. An installation according to claim 4, wherein pressure exerted by the bearing plate on the fibrous layers is controlled.

6. An installation according to claim 1, wherein the bearing plate is carried by an actuator which presses the bearing plate against the fibrous layers.

* * * * *